E. H. BAWEL.
HARROW.
APPLICATION FILED DEC. 24, 1914.

1,140,564. Patented May 25, 1915.

E. H. Bawel
Inventor,

Witnesses by C. A. Snow & Co.
Attorneys.

UNITED STATES PATENT OFFICE.

EDWARD H. BAWEL, OF BOONVILLE, INDIANA.

HARROW.

1,140,564.  Specification of Letters Patent.  Patented May 25, 1915.

Application filed December 24, 1914. Serial No. 878,906.

*To all whom it may concern:*

Be it known that I, EDWARD H. BAWEL, a citizen of the United States, residing at Boonville, in the county of Warrick and State of Indiana, have invented a new and useful Harrow, of which the following is a specification.

The present invention appertains to harrows, and aims to provide a novel and improved earth tilling implement of that character.

One of the objects of this invention is to provide a harrow embodying unique means for adjusting the harrow teeth.

Another object of the invention is to provide a harrow embodying a unique assemblage of component parts to enhance the utility thereof.

It is also within the scope of the invention to provide a harrow of the nature indicated, which will be comparatively simple and inexpensive in construction, and which will be convenient, serviceable, efficient and thoroughly practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein—

Figure 1:
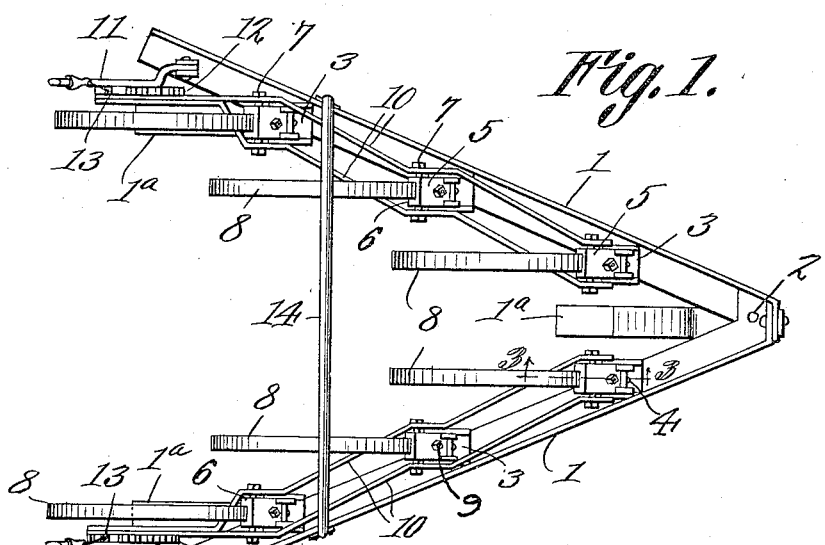
Figure 2:
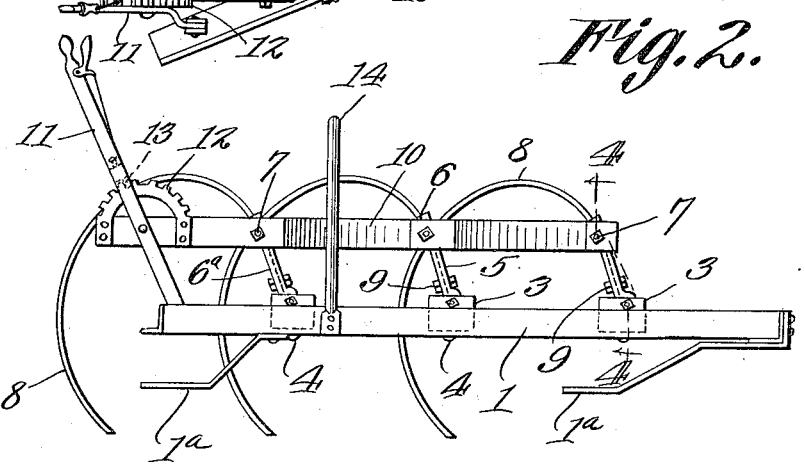
Figures 3, 4:
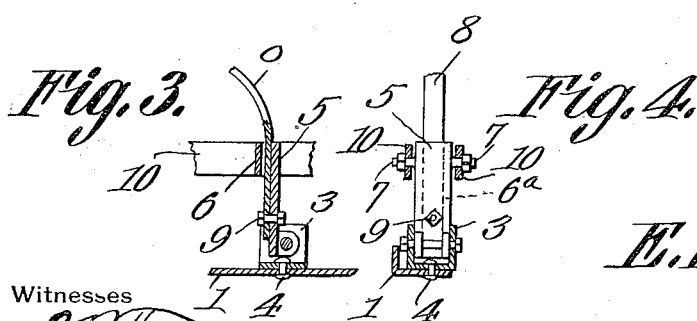

Figure 1 is a plan view of the improved harrow. Fig. 2 is a side elevation thereof. Fig. 3 is a sectional detail taken on the line 3—3 of Fig. 1. Fig. 4 is a sectional detail taken on the line 4—4 of Fig. 2.

The harrow frame embodies a pair of angle-iron beams 1, which have their front ends pivoted together, as at 2, and which diverge rearwardly. The frame may be drawn over the soil by any suitable draft means, it being noted that the beams 1 are arranged obliquely relative to the longitudinal median line of the frame which extends through the pivot 2. The beams 1 are carried by suitable runners 1ª attached thereto.

Each of the beams 1 carries a series or gang of harrow teeth or earth tilling elements, and to this end a plurality of U-shaped members 3 are pivoted upon the lower inwardly projecting flange of each beam 1, by means of rivets or other pivot elements 4, and levers 5 have their lower ends fulcrumed or pivoted between the arms or side portions of the members 3. The levers 5 project upwardly from the beams 1 and the members 3 are so arranged that the levers 5 may swing forwardly and rearwardly, it being noted that the members 3 may swing upon the beams 1 in order that the levers 5 may properly adjust themselves. It is also to be noted that the levers 5 swing in longitudinal planes which are arranged obliquely relative to the beams 1 or at acute angles relative thereto.

The levers 5 carry the harrow teeth or earth tilling elements, and to this end, the upper end portions of the levers have rear loops 6 and the side edges of the levers have rearwardly projecting flanges 6ª. The opposite sides of the loops 5 have trunnions or pivot elements 7 projecting therefrom. The curved harrow teeth 8, which are formed from bars or other suitable stock, have their shank portions passed downwardly through the loops 6 and between the flanges 6ª in rear of the levers 5, and the shank portions of the teeth are secured to the back sides of the levers 5 by means of bolts or securing elements 9. The teeth or tilling elements 8 are curved rearwardly and downwardly from the shank portions, and the shank portions of the teeth 8 in working within the loops 6 will be free to flex for limited movement relative to the levers 5 without interference. The teeth 8 trail in rear of the beams 1, and the loops 6 serve as stops for limiting the rearward springing of the teeth.

In order to actuate or swing the respective sets of levers 5, a pair of zig-zag strips or links 10 are disposed at the opposite sides of each set of levers 5, and are pivotally engaged to the trunnions or pivot elements 7.

An operating or actuating hand lever 11 is fulcrumed to the rear or free end of each beam 1, and is pivoted to the rear ends of the respective links 10, a toothed segment 12 being carried by the rear end portion of one link 10 of each pair for the engagement of a manually operated pawl or dog 13 carried by the adjacent hand lever 11.

As a means for holding the beams 1 in an angular position relative to one another, an arched rod 14 is terminally engaged to the upstanding flanges of the beams 1, and if desired, the arch 14 may be adjustably engaged to one or both of the beams in any suitable manner, in order that the beams may be held at various angles relative to one another.

In operation, when the harrow is drawn over the soil, with the teeth 8 swung downwardly, as seen in Fig. 2, the teeth will serve to thoroughly agitate and pulverize the soil. The teeth may flex or spring when encountering non-yielding objects or obstructions, it being noted, however, that the teeth are prevented from yielding excessively by their contact with the loops 6. The teeth 8 may be adjusted or swung upwardly and downwardly through the medium of the hand levers 11, which in being swung will move the links lengthwise, so as to swing levers 5 either upwardly or downwardly, as desired. The hand levers 11 and the levers 5 swing obliquely relative to the beams, but notwithstanding this, the levers 5 may be readily swung for limited movement through the medium of the actuating means herein disclosed. The dogs or pawls 13 of the hand levers 11 being engaged to the segments 12 will ordinarily lock the levers 11 and links 10 against relative movement, thereby to normally hold the levers 5 and teeth 8 carried thereby, in a stationary position relative to the beams.

The harrow frame may be constructed in various sizes and of various materials, and may also be made in various shapes or proportions, according to the use to which the device is to be put in practice.

Having thus described the invention, what is claimed as new is:—

In an earth tilling implement, a diagonally arranged beam, a plurality of levers fulcrumed to and projecting upwardly therefrom and arranged to swing in oblique planes relative to the beam, spring teeth attached to the said levers and curved rearwardly and downwardly therefrom in rear of the beam, the upper ends of the levers having loops through which the said teeth extend, an actuating means carried by the beam and operatively connected to the said levers for swinging them forwardly and rearwardly.

In testimony that I claim the foregoing as my own, I have hereto affixed my signature in the presence of two witnesses.

EDW. H. BAWEL.

Witnesses:
F. H. RAUTH,
FRED BAWEL.